United States Patent [19]

Bethards

[11] Patent Number: 5,134,868
[45] Date of Patent: Aug. 4, 1992

[54] WHEEL LOCKING DEVICE FOR ALL TYPES OF VEHICLES

[76] Inventor: Greg Bethards, 1124 N. Sage Ct., Sunnyvale, Calif. 94087

[21] Appl. No.: 787,745

[22] Filed: Nov. 4, 1991

Related U.S. Application Data

[63] Continuation of Ser. No. 572,221, Aug. 24, 1990, abandoned.

[51] Int. Cl.[5] ............................................. B62H 5/16
[52] U.S. Cl. ................................. 70/18; 70/226; 188/32
[58] Field of Search ................ 70/14, 18, 19, 259, 70/260, 225, 226, 237, 209–212; 188/32

[56] References Cited

U.S. PATENT DOCUMENTS

| | | | |
|---|---|---|---|
| Re. 24,712 | 10/1959 | Marugg | 70/225 |
| D. 221,417 | 8/1971 | Prichard | 70/18 X |
| 1,098,103 | 5/1914 | Freschl | 70/19 |
| 1,408,133 | 2/1922 | Ochs et al. | 70/90 |
| 1,456,021 | 5/1923 | Hedglin | 188/32 |
| 1,488,893 | 4/1924 | Plouffe | 70/90 |
| 1,489,272 | 4/1924 | Murrah | 70/18 |
| 1,495,883 | 5/1924 | Chadwick et al. | 70/90 |
| 1,503,210 | 7/1924 | Shannon | 70/18 |
| 1,504,220 | 8/1924 | Degen | 188/31 |
| 1,508,547 | 9/1924 | Gentle et al. | 70/90 |
| 1,515,097 | 11/1924 | Dickson | 70/90 |
| 1,589,233 | 6/1926 | Schneider | 188/31 |
| 2,844,954 | 7/1958 | Marugg | 70/225 |
| 2,960,857 | 11/1960 | Winter | 70/19 |
| 3,550,409 | 12/1970 | Pariser | 70/203 |
| 3,664,164 | 5/1972 | Zaidener | 70/202 |
| 3,805,564 | 4/1974 | Velardo | 70/18 |
| 3,828,590 | 8/1974 | Thiebault | 70/19 |
| 3,855,825 | 12/1974 | Pickard | 70/226 X |
| 3,907,072 | 9/1975 | Shafer | 70/226 X |
| 4,164,131 | 8/1979 | Desmond et al. | 70/14 |
| 4,175,410 | 11/1979 | Schwaiger | 70/226 |
| 4,441,586 | 10/1981 | Bernier | 188/32 |
| 4,622,833 | 11/1986 | Shepherd | 70/226 |
| 4,768,359 | 9/1988 | Wade | 70/14 |
| 4,819,462 | 4/1989 | Apsell | 70/226 X |
| 4,833,442 | 5/1989 | Von Heck | 70/226 X |
| 4,887,443 | 12/1989 | Wang | 70/209 |

FOREIGN PATENT DOCUMENTS

| | | | |
|---|---|---|---|
| 539090 | 6/1922 | France | 70/18 |
| 2520683 | 8/1983 | France | 70/226 |
| 2548114 | 1/1985 | France | 70/260 |
| 0076348 | 5/1983 | Japan | 70/225 |
| WO8605150 | 9/1986 | PCT Int'l Appl. | 70/237 |
| 82392 | 9/1919 | Switzerland | 70/18 |

*Primary Examiner*—Lloyd A. Gall
*Attorney, Agent, or Firm*—Rosenblum, Parish & Isaacs

[57] ABSTRACT

An improved device for immobilizing or impounding any vehicle includes a pair of jaws that can be brought together on either side of a wheel to capture that wheel. A chock of width equal to the wheel rests against the ground and prevents movement of the captured wheel. The device is preferably made of hardened steel and is assembled in such a way as to make non-destructive disassembly impossible. The design and construction of the device make it impossible to twist or otherwise misalign the jaws or the chock of the device, except by use of extreme and excessive force.

9 Claims, 5 Drawing Sheets

WHEEL LOCKING DEVICE FOR ALL TYPES OF VEHICLES

This is a continuation of copending application(s) Ser. No. 07/572,221 filed on Aug. 24, 1990, now abandoned.

BACKGROUND OF THE INVENTION

1. Field of the Invention

The field of invention for this device is that of vehicle security from theft or unauthorized use. In particular, this invention relates to an improved device for the immobilization preventing theft or unauthorized use.

2. Description of the Prior Art

The need on the part of the owner to secure a vehicle such as an automobile, truck, bicycle, motorcycle, trailer of any type, or an airplane from theft or unauthorized use is self evident. There also exists a need on the part of law enforcement to prevent the movement of a vehicle that has been involved in some violation or commission of a crime.

There are a wide variety of devices designed to prevent the movement of a vehicle. The method used for most self-powered vehicles is two-fold, consisting of locked doors which prevent access to the controls and a locking ignition system which prevents the use of the engine or power to the vehicle. The locked ignition system is also used by vehicles that cannot prevent access to the controls, such as motorcycles. However, in the case of vehicles which are not self-powered, security must be established either by storing the vehicle inside a secure location or by preventing the movement of the vehicle.

The prior art teaches a number of devices designed to prevent the movement of a vehicle, whether self-powered or unpowered, such as making the socket of a trailer hitch unusable or attaching a device to a wheel in order to impede or prevent the rotation of that wheel. See, for example, U.S. Pat. No. 3,828,590 to Thiebault; U.S. Pat. No. 3,907,072 to Shafer; U.S. Pat. No. 4,164,131 to Desmond et al.: U.S. Pat. No. 4,441,586 to Bernier et al.; and U.S. Pat. No. 4,768,359 to Wade. The existing devices have drawbacks in either design or application which make them impractical and of limited use.

SUMMARY OF THE INVENTION

The improved wheel immobilization device of this invention comprises a self adjusting chock, a pair of jaws which move against each other, and an integral locking mechanism which both keeps the jaws in alignment with each other and prevents the opening of the jaws.

In operation, the jaws are opened by first opening the lock with a key. The jaws may then be opened by pushing a horizontal ratchet bar through the outside jaw/chock bar. Since the jaws do not interfere with each other, the minimum wheel width that the jaws can accommodate is less than one inch and the only limitation on the size of the opening of the jaws is the length of the horizontal ratchet bar, which in normal usage would be long enough to allow the jaws to open far enough to capture the double wheels of a truck. The key is then removed from the lock and, with the jaws in open position, the user puts the ends of the jaws around the forward side of one of the wheels of a vehicle. Holding the outside jaw/chock bar against the wheel, the user then draws the ratchet bar through the outside jaw/chock bar, thus bringing the inside jaw/chock bar firmly against the inside of the wheel and capturing the wheel. The chock is allowed to rest on the ground and the vehicle is now secure since the captured wheel cannot be rotated.

This invention has a number of objectives and a wide variety of application. The first objective is to provide an improved device that will attach to a wheel of a vehicle. A second objective is to provide a chock against movement of the contained wheel. A further objective is to prevent the theft or unauthorized use of any type of vehicle. Another objective is to provide an improved vehicle immobilization device of simple construction. An additional objective is to provide a device of high durability which will withstand virtually every attempt to destroy it or remove it forcibly from the wheel.

These and other objectives, features, and advantages of the invention will become apparent from the following detailed description of specific embodiments which form a part of the specification, wherein like reference characters designate corresponding parts of the several views.

DETAILED DESCRIPTION OF THE PREFERRED EMBODIMENT

Figure 1:
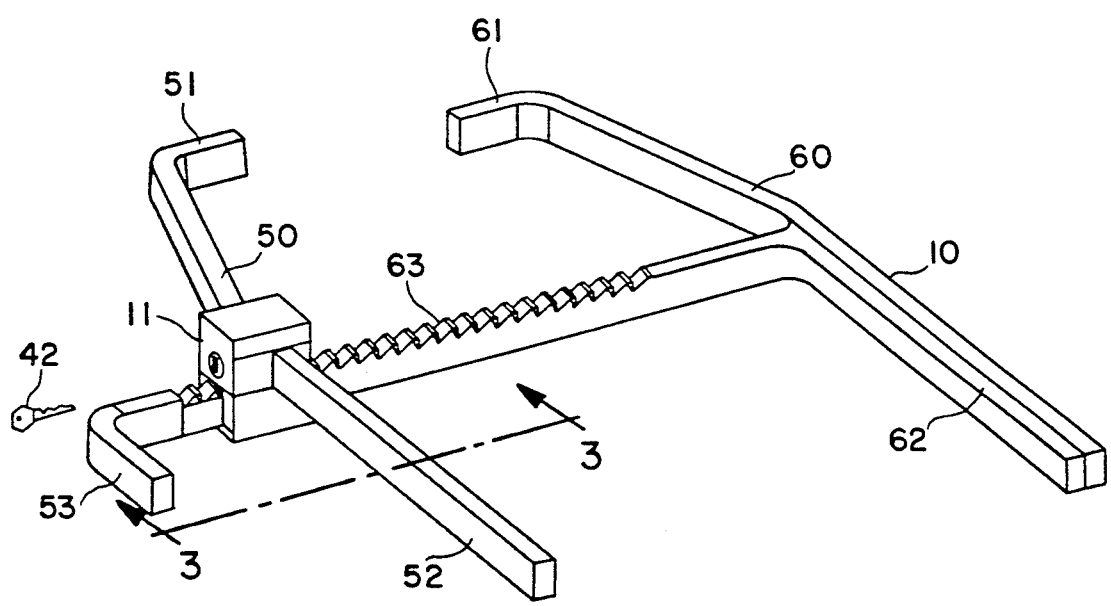
FIG. 1 is a perspective view of the invention in assembled form as it would appear when not attached to a wheel of a vehicle.

A device 10 for immobilizing any wheeled vehicle according to the present invention is shown in FIG. 1. Device 10 includes a passive bar 50, an active bar 60, a ratchet bar 63, and a lock block 11. Passive bar 50 includes a passive jaw 51 and passive leg 52. Similarly, active bar 60 includes active jaw 61 and active leg 62. The lock block 11 is affixed to the passive bar 50. The ratchet bar 63, which is joined to active bar 60, passes through the lock block 11. This aligns both bars 50 and 60 in a definite position with reference to each other. Ratchet bar 63 also has a handle 53 at its outside end. Handle 53 both provides a means of drawing jaws 51 and 61 together and preventing ratchet bar 63 from being pushed through lock block 11. This makes it impossible to disassemble the device 10.

Device 10 also includes a chock comprised of passive leg 52, ratchet bar 63, and active leg 62. Passive leg 52 is the extension of passive bar 50, and active leg 62 is the extension of active bar 60. Ratchet bar 63 comprises the horizontal section of the chock. This arrangement allows the chock to be of variable size and adjustable to a width which is the same as the width of the tire on a contained wheel.

Figure 2:
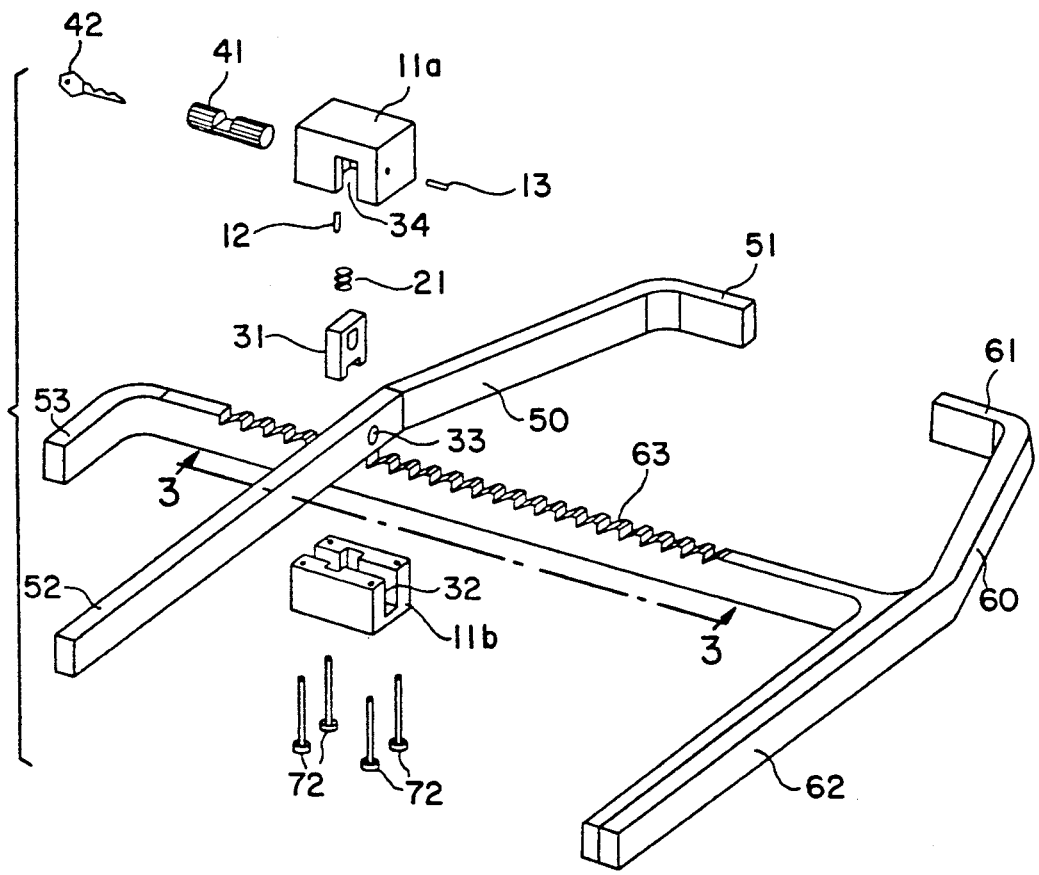
FIG. 2 is an exploded perspective view depicting a preferred embodiment of the invention showing the parts of the locking mechanism.
Figure 3:
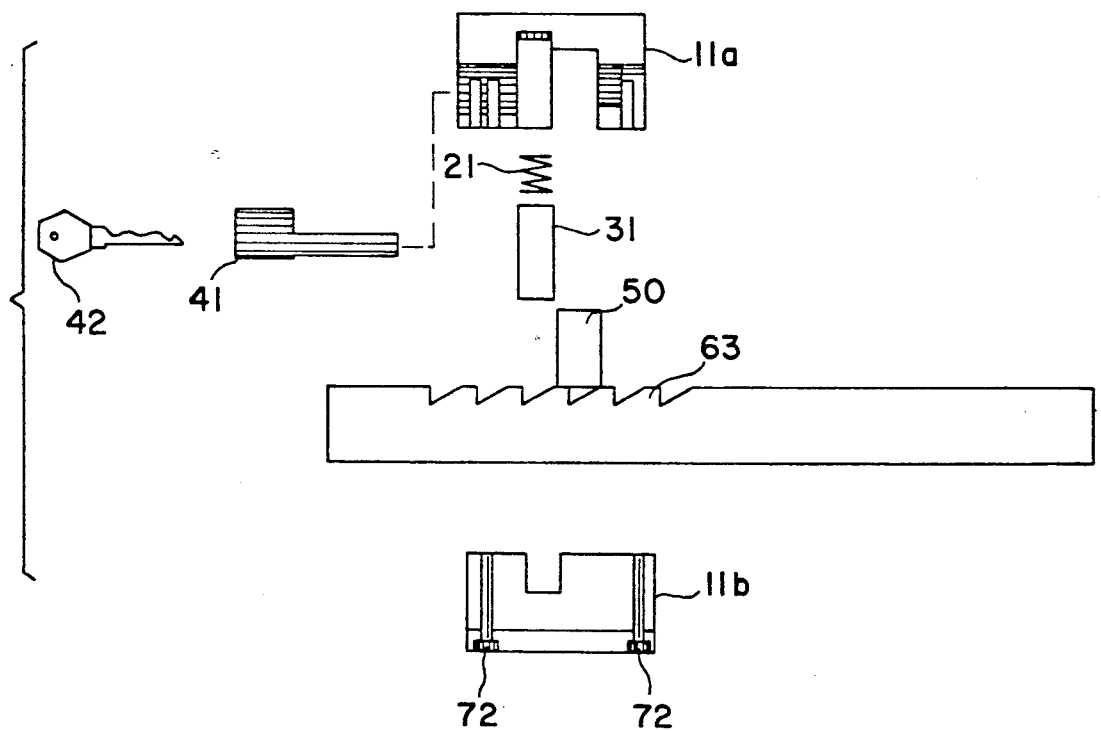
FIG. 3 a cross-sectional view taken along a vertical plane through line 3—3 of FIG. 2.
Figure 5:
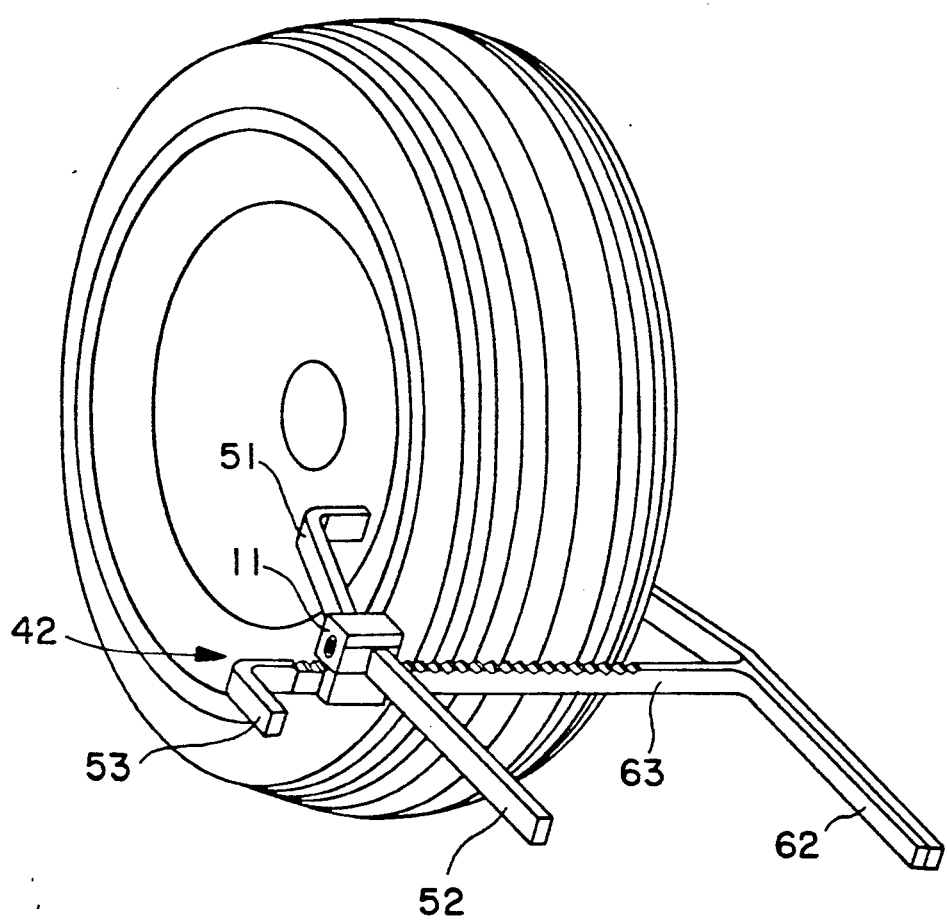
FIG. 5 is a perspective view depicting the invention as it would appear when attached to a wheel of a vehicle.

In operation, device 10 is very simple to use. With reference to FIG. 1, FIG. 2, and FIG. 3, lock 41 is turned by key 42 so that latch 31 is in a raised position and is disengaged from ratchet bar 63. The user then grasps passive bar 50 with one hand and handle 53 with the other and opens jaws 51 and 61 by pushing ratchet bar 63 through lock bloc 11. Lock 41 is then turned by key 42 so that latch 31 is in a lowered position and will engage with ratchet bar 63. Key 42 is then removed from lock 41 and jaws 51 and 61 are placed on either side of the wheel that the user wishes to immobilize. Jaws 51 and 61 are drawn together by the user by holding passive bar 50 against the wheel and pulling handle 53 toward the user so that ratchet bar 63 is pulled through lock block 11 until both jaws 51 and 61 are firmly against the immobilized wheel as shown in FIG. 5. As ratchet bar 63 is pulled through lock block 11, spring 21 causes latch 31 to move up and down against ratchet bar 63 and to finally engage ratchet bar 63 in a detent so that ratchet bar 63 cannot be pushed back through lock block 11. Thus, device 10 is firmly attached to the immobilized wheel and the only way to remove device 10 from the immobilized wheel is to disengage latch 31 from ratchet bar 63 by using key 42. If device 10 is used on any wheel which does not have a rim that jaws 51 and 61 can be pulled against but instead is of a design such that jaws 51 and 61 can pass through the wheel (such as a bicycle or motorcycle wheel), jaws 51 and 61 are offset so that active jaw 61 can be pulled past passive jaw 51 and the immobilized wheel will then be trapped by the extensions of jaws 51 and 61. Jaws 51 and 61 will then be seen to be on the side of the wheel opposite to that which they are normally found, having actually been pulled through the wheel. In such a case, the chock, comprised of legs 52 and 62 and ratchet bar 63 will still be the same width as the immobilized wheel.

Figure 4:
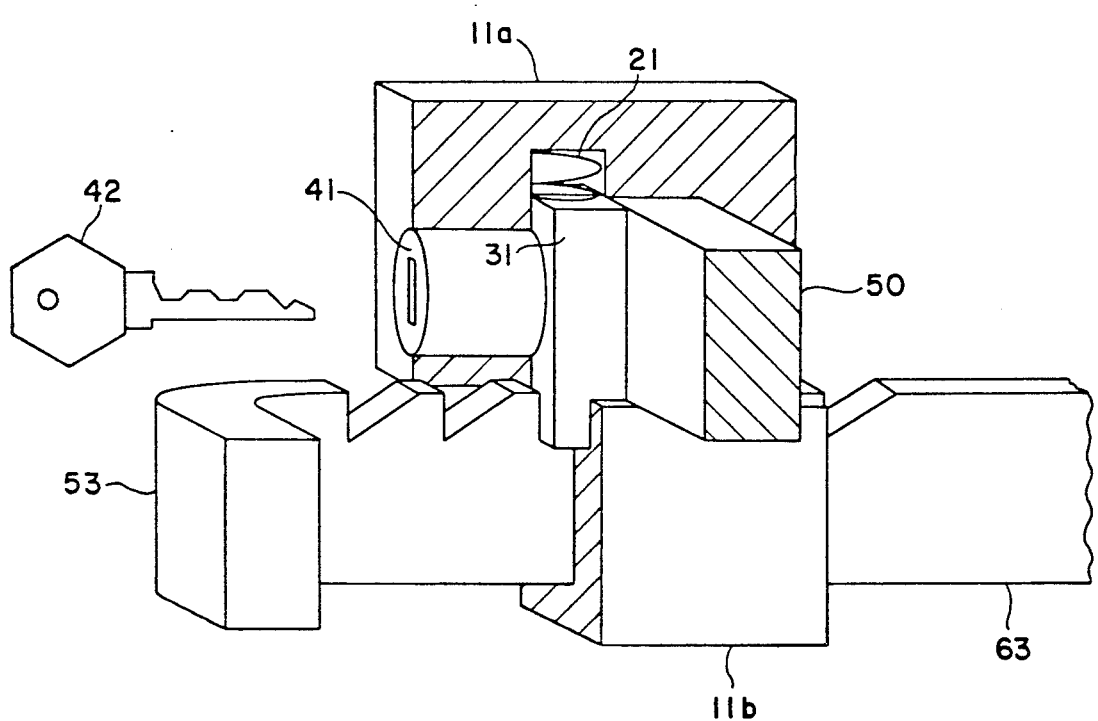
FIG. 4 is a close-up cut-away view showing the assembled locking mechanism.

With reference to FIG. 2, FIG. 3 and FIG. 4, it may be seen that the construction of device 10 is very straight-forward, comprising a minimum number of parts. Bars 50 and 60 and ratchet bar 63 are preferably made of hardened rectangular steel. Passive jaw 51 and passive leg 52 thus are extensions of the same bar of steel, as are active jaw 61 and active leg 62. Ratchet bar 63 is welded to active bar 60 so that they are in fixed position with reference to each other. Lock block 11 housing is preferably made of hardened steel and is assembled by bolting upper lock block 11a to lower lock block 11b with non-removable bolts 72. Lock block 11 contains: a hardened steel lock 41 which is held in place by non-removable set screw 12; a hardened steel latch 31; and a latch spring 21. Lock block 11 holds passive bar 50 firmly in a rectangular channel 34 and movement is prevented by non-removable set screw 13. Movement or separation is further prevented by lock 41 which passes through a hole 33 in passive bar 50. Ratchet bar 63 is contained by lock block 11 but can slide to and fro through lock block 11 when latch 31 is raised and only toward the user when latch 31 is engaged. However, the rectangular channel 32 in lock block 11 will not allow ratchet bar 63 to be twisted in any direction whatsoever. This fixes ratchet bar 63, and therefore active bar 60, absolutely in a non-rotating position with reference to passive bar 50.

It is to be understood that the forms of the invention herein shown and described are to be taken as preferred examples of the invention and that various changes in the shape, size, materials and arrangement of parts may be made without departing from the invention or the scope of the claims.

I claim:

1. A device for immobilizing a wheel, comprising:
   a ratchet bar;
   an active bar connected to and lying in approximately the same plane as said ratchet bar, said active bar including an active jaw and an active leg, said active jaw and active leg extending on opposite sides of said ratchet bar;
   a passive bar lying in approximately the same plane as said ratchet bar, said passive bar including a passive jaw extending on the same side of said ratchet bar as said active jaw and offset from said active jaw to prevent interference of said jaws, said passive bar further including a passive leg extending on the same side of said ratchet bar as said active leg; and
   locking means for securing said ratchet bar to said passive bar, said locking means permitting said ratchet bar and said active bar to slidably move toward said passive bar, causing said active jaw and said passive jaw to engage a wheel between said jaws, thereby permitting said ratchet bar to rest against the road surface of said wheel and causing said active leg, said passive leg, and said ratchet bar to form a chock limiting rotation of said wheel.

2. The device of claim 1, further comprising a handle for moving said ratchet bar and said active bar toward said passive bar.

3. The device of claim 2, wherein said handle is an extension of said ratchet bar.

4. The device of claim 1, wherein said ratchet bar has a plurality of teeth, and said locking means includes a channel for passage of said teeth and a detent for engaging said teeth.

5. A device for immobilizing a wheel, comprising:
   a ratchet bar having a plurality of teeth, said ratchet bar further including a handle formed from an extension of said ratchet bar;
   an active bar connected to and lying in approximately the same plane as said ratchet bar, said active bar including an active jaw and an active leg, said active jaw and active leg extending on opposite sides of said ratchet bar;
   a passive bar lying in approximately the same plane as said ratchet bar, said passive bar including a passive jaw extending on the same side of said ratchet bar as said active jaw and offset from said active jaw to prevent interference of said jaws, said passive bar further including a passive leg extending on the same side of said ratchet bar as said active leg; and
   locking means for securing said ratchet bar to said passive bar, said locking means including a channel for passage of said teeth and a detent for engaging said teeth, said locking means permitting said ratchet bar and said active bar to slidably move toward said passive bar, causing said active jaw and said passive jaw to engage a wheel between said jaws, thereby permitting said ratchet bar to rest against the road surface of said wheel and causing said active leg, said passive leg, and said ratchet bar to form a chock limiting rotation of said wheel.

6. A device for immobilizing a wheel, comprising:
   a ratchet bar;
   first means forming an active bar rigidly connected to and lying in approximately the same plane as said ratchet bar, said active bar including first jaw portion and first leg portion, said first jaw portion and said first leg portion extending on opposite sides of said ratchet bar;

second means forming a passive bar lying in approximately the same plane as said ratchet bar, said passive bar including second jaw portion extending on the same side of said ratchet bar as said first jaw portion and offset from said first jaw portion to prevent interference of said jaw portions, said passive bar further including a second leg portion extending on the same side of said ratchet bar as said first leg portion; and locking means for securing said ratchet bar to said passive bar, said locking means for securing said ratchet bar to said passive active bar to slidably move toward said passive bar, causing said active bar and said passive bar to engage a wheel between said first and said second jaw portions, thereby permitting said ratchet bar to rest against the road surface of said wheel and causing said first and said second leg portions and said ratchet bar to form a chock limiting rotation of said wheel.

7. The device of claim 6, further comprising a handle for moving said ratchet bar and said active bar toward said passive bar.

8. The device of claim 7, wherein said handle is an extension of said ratchet bar.

9. The device of claim 6, wherein said ratchet bar has a plurality of teeth, and said locking means includes a channel for passage of said teeth and a detent for engaging said teeth.

* * * * *